US011932485B2

(12) United States Patent
Patel

(10) Patent No.: US 11,932,485 B2
(45) Date of Patent: Mar. 19, 2024

(54) LOCKING MECHANISM FOR CONTAINER

(71) Applicant: Krishiv Patel, Shelton, CT (US)

(72) Inventor: Krishiv Patel, Shelton, CT (US)

( * ) Notice: Subject to any disclaimer, the term of this patent is extended or adjusted under 35 U.S.C. 154(b) by 245 days.

(21) Appl. No.: 17/185,052

(22) Filed: Feb. 25, 2021

(65) Prior Publication Data

US 2022/0267088 A1 Aug. 25, 2022

(51) Int. Cl.
*B65F 1/16* (2006.01)
*E05B 15/16* (2006.01)
(Continued)

(52) U.S. Cl.
CPC ........ *B65F 1/1615* (2013.01); *E05B 15/1635* (2013.01); *E05B 57/00* (2013.01);
(Continued)

(58) Field of Classification Search
CPC ..... E05C 3/00; E05C 3/02; E05C 3/04; E05C 3/041; E05C 3/042; E05C 3/043; E05C 3/045; E05C 3/12; E05C 3/14; E05C 3/145; E05C 2003/128; E05B 15/0093; E05B 57/00; E05B 15/1635; E05B 65/006; Y10T 292/0911; Y10T 292/0937; Y10T 292/0944; Y10T 292/0951; Y10T 292/0952; Y10T 292/0953; Y10T 292/0959; Y10T 292/1043; Y10T 292/1063; Y10T 292/1072; Y10T 292/1083; Y10T 292/1084;
(Continued)

(56) References Cited

U.S. PATENT DOCUMENTS 5,149,153 A * 9/1992 Drewry ................ B65F 1/1615 292/341.15
5,490,606 A * 2/1996 Lombardo .............. B65F 1/004 220/908

(Continued)

FOREIGN PATENT DOCUMENTS

DE 202019104264 U1 * 12/2020 ............ B65F 1/1615
EP 872432 A1 * 10/1998 ............ B65F 1/1615
WO WO-2020024015 A1 * 2/2020 ........... E05B 1/0038

OTHER PUBLICATIONS

Video: "Krishiv Patel Invention Convention—The Tubular Trash Tin", accessed at https://www.youtube.com/watch?v=xagFnlooAMQ, Uploaded Apr. 26, 2020 (1 page).

*Primary Examiner* — Christine M Mills
*Assistant Examiner* — Christopher F Callahan
(74) *Attorney, Agent, or Firm* — Wilmer Cutler Pickering Hale and Dorr LLP

(57) ABSTRACT

A locking mechanism is disclosed. In one particular embodiment, the locking mechanism may include a hook component configured to be mounted onto an interior surface of a body of a container, a swivel component configured to engage with the hook component when the locking mechanism is locked, and a mount component to which the swivel component is rotatably mounted. The mount component may be configured to be mounted onto an interior surface of a lid of the container. When the container is in an upright position, the locking mechanism may be unlocked by applying an upward force onto the swivel component. When the container is an upside down position, the locking mechanism may unlock automatically.

20 Claims, 4 Drawing Sheets

(51) Int. Cl.
*E05B 57/00* (2006.01)
*E05B 65/00* (2006.01)
*E05C 3/14* (2006.01)

(52) U.S. Cl.
CPC .............. *E05B 65/006* (2013.01); *E05C 3/14* (2013.01); *B65F 2210/148* (2013.01)

(58) Field of Classification Search
CPC ......... Y10T 292/1085; Y10T 292/1092; Y10S 292/11; Y10S 292/22; B65F 1/1615; B65F 2210/148
See application file for complete search history.

(56) References Cited

U.S. PATENT DOCUMENTS

| | | | | | |
|---|---|---|---|---|---|
| 6,290,093 | B1 * | 9/2001 | Obriot | E05B 15/0093 | 220/908 |
| 7,540,393 | B2 * | 6/2009 | Wong | B65F 1/1615 | 220/908 |
| 7,597,365 | B2 * | 10/2009 | Kreitzer | B65F 1/1615 | 292/148 |
| 7,988,009 | B2 * | 8/2011 | Cavalcante | B65F 1/141 | 220/908 |
| 9,981,802 | B2 * | 5/2018 | Reeb | E05B 65/006 | |
| 2003/0168466 | A1 * | 9/2003 | Spiers | B65F 1/1615 | 220/908 |
| 2010/0102575 | A1 * | 4/2010 | Ferkovich | B65F 1/1615 | 292/259 R |
| 2014/0238990 | A1 * | 8/2014 | Banik | B65F 1/1615 | 220/324 |
| 2015/0035288 | A1 * | 2/2015 | Fink | B65F 1/1615 | 292/2 |
| 2015/0053684 | A1 * | 2/2015 | Nussbaum | B65F 1/1615 | 220/324 |
| 2015/0159404 | A1 * | 6/2015 | Treadwell | E05B 15/0093 | 220/326 |
| 2016/0159570 | A1 * | 6/2016 | Reeb | E05B 17/2034 | 292/197 |
| 2018/0370723 | A1 * | 12/2018 | Reeb | E05B 65/006 | |
| 2020/0079586 | A1 * | 3/2020 | Asmis | E05B 57/00 | |

* cited by examiner

LOCKING MECHANISM FOR CONTAINER

FIELD OF THE DISCLOSURE

The present disclosure relates generally to a locking mechanism and, more particularly, to a locking mechanism that may be mounted on a container, that may be unlocked by human interaction when the container is in an upright position or on its sides, and that may unlock automatically when the container is in an upside down position.

BACKGROUND OF THE DISCLOSURE

Typically, containers for garbage, recycling, or other types of waste are not equipped with any locking mechanism to keep them closed. Such a locking mechanism could interfere with waste removal services that collect such waste by upending the container's contents into a waste removal truck. However, it is often a nuisance when animals and rodents tip over such containers in search for food. When the containers are tipped over, their lids are thrown open. As a result, the contents of the containers spill out of the containers and/or the animals or rodents find their way inside the containers.

In view of the foregoing, it may be understood that there is a need for a locking mechanism that may be mounted on a container, that may be unlocked only by human interaction when the container is upright or on its sides, and that may unlock automatically when the container is upside down to be purposely emptied, for example, into a waste removal truck.

SUMMARY OF THE DISCLOSURE

A locking mechanism is disclosed. In one particular embodiment, the locking mechanism may include a hook component configured to be mounted onto an interior surface of a body of a container, a swivel component configured to engage with the hook component when the locking mechanism is locked, and a mount component to which the swivel component is rotatably mounted. The mount component may be configured to be mounted onto an interior surface of a lid of the container. When the container is in an upright position, the locking mechanism may be unlocked by applying an upward force onto the swivel component. When the container is an upside down position, the locking mechanism may unlock automatically.

In accordance with other aspects of this particular embodiment, the mount component may be configured to be mounted onto the interior surface of the lid of the container using a plurality of bolts, rivets, or screws.

In accordance with other aspects of this particular embodiment, the hook component may be configured to be mounted onto the interior surface of the body of the container using a plurality of bolts, rivets, or screws.

In accordance with other aspects of this particular embodiment, the swivel component may be rotatably mounted onto the mount component using a pin, a rivet, or a bolt.

In accordance with other aspects of this particular embodiment, the mount component may include a groove that engages with the hook component when the locking mechanism is in a locked position.

In accordance with other aspects of this particular embodiment, the swivel component may include a latching portion, a handle portion, and/or a weighted portion.

In accordance with other aspects of this particular embodiment, the swivel component may include a latching portion that may latch onto the hook component when the locking mechanism is in a locked position.

In accordance with other aspects of this particular embodiment, the swivel component may include a handle portion that may be accessible from an exterior of the lid of the container.

In accordance with other aspects of this particular embodiment, the handle portion may pass through an opening in the lid of the container.

In accordance with other aspects of this particular embodiment, when the container is in the upright position, the upward force may be applied to the handle portion to unlatch the latching portion from the hook component.

In accordance with other aspects of this particular embodiment, the swivel component may include a weighted portion and, when the container is in the upright position, the weighted portion may apply a downward force onto the swivel component to keep the latching portion latched onto the hook component.

In accordance with other aspects of this particular embodiment, the swivel component may include a weighted portion and, when the container is in the upside down position, the weighted portion may apply a downward force onto the swivel component to unlatch the latching portion from the hook component.

In accordance with other aspects of this particular embodiment, the mount component may be made of a metal, a plastic, or a composite.

In accordance with other aspects of this particular embodiment, the hook component may be made of a metal, a plastic, or a composite.

In accordance with other aspects of this particular embodiment, the swivel component may be made of a metal, a plastic, or a composite.

In accordance with other aspects of this particular embodiment, the container may be a waste receptacle.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1A:
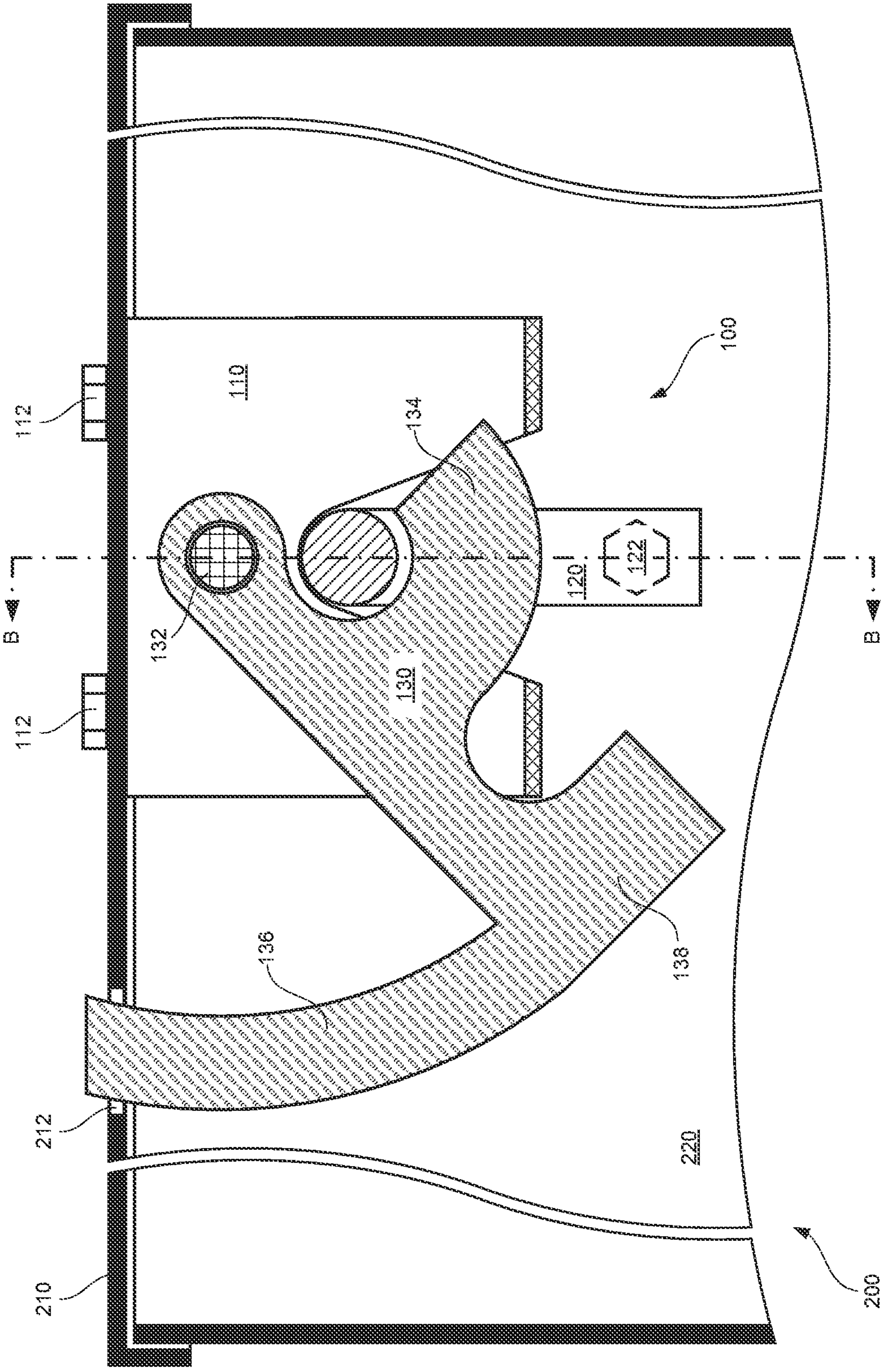
FIG. 1A is a sectional view of a locking mechanism mounted on a container, in accordance with an embodiment of the present disclosure.
Figure 1B:
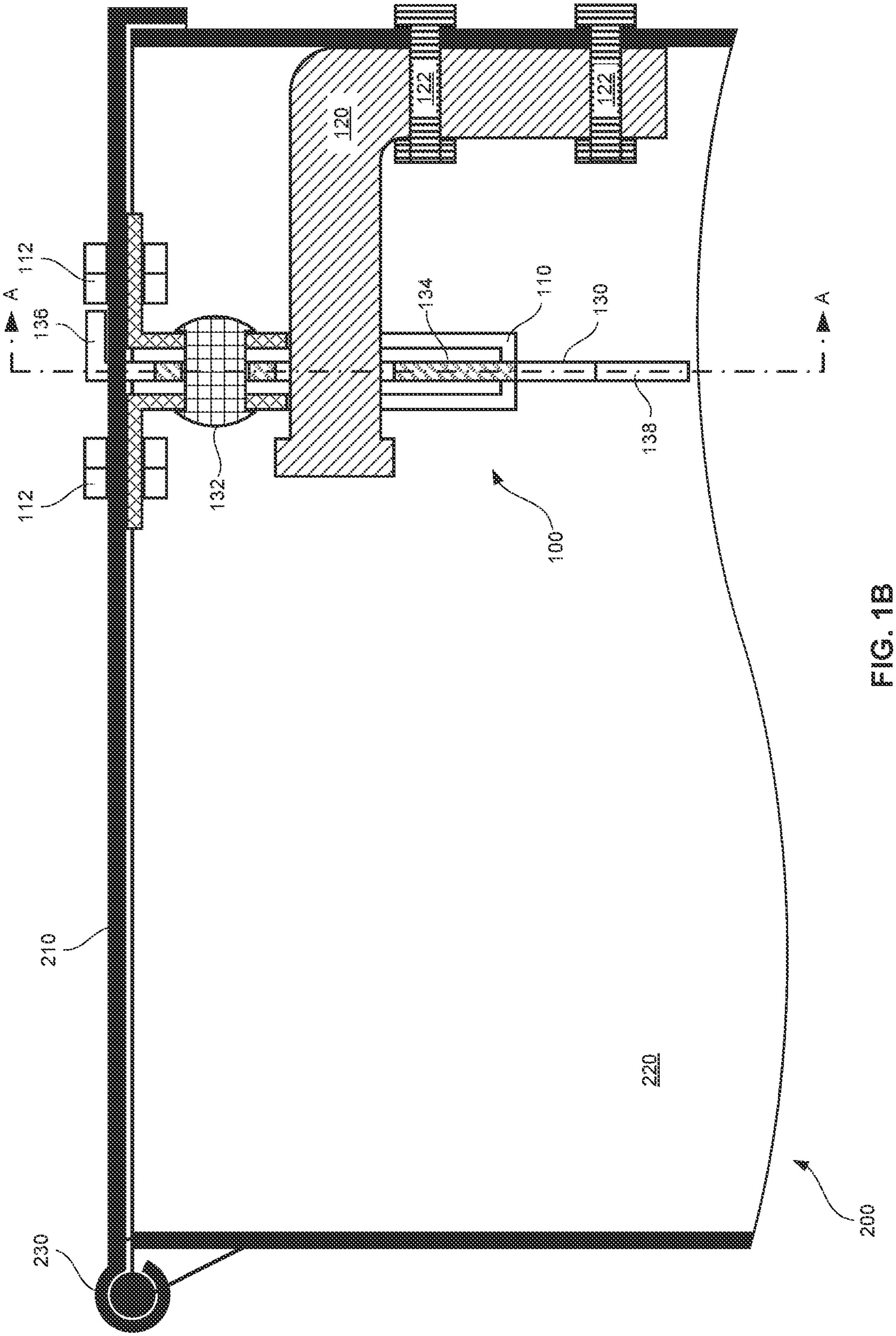
FIG. 1B is another sectional view of the locking mechanism mounted on the container, in accordance with an embodiment of the present disclosure.

Referring to FIGS. 1A and 1B, there is shown a locking mechanism 100 mounted on a container 200 and in a locked position, in accordance with an embodiment of the present disclosure. FIG. 1A is a sectional view A-A of the locking mechanism 100 and the container 200 corresponding to the A-A cutting plane shown in FIG. 1B. Similarly, FIG. 1B is a sectional view B-B of the locking mechanism 100 and the container 200 corresponding to the B-B cutting plane shown in FIG. 1A. The container 200 may comprise a body 220, a lid 210 sized and shaped so as to fit the body 220 to form a closed receptacle, and a swivel joint 230 connecting the lid 210 to the body 220 such that the lid 210 may swivel to open and close the container 200.

In an embodiment, the locking mechanism 100 includes a mount component 110, a hook component 120, and a swivel component 130. The mount component 110 may be mounted on an interior surface of the lid 210. In an embodiment, the mount component 110 may be mounted onto the lid 210 by means of a plurality of (e.g., four) bolts and nuts 112. Alternatively, the mount component 110 may be riveted or screwed onto the lid 210. In other embodiments, the mount component 110 may be glued to the lid 210. In an embodiment, the mount component 110 may include a groove—for example, illustrated as an inverted V-shape groove—that engages with the hook component 120 when the lid 210 is closed. In an embodiment, the mount component 110 may be shaped as shown in FIGS. 1A and 1B to accommodate the swivel component 130.

In an embodiment, the hook component 120 may be mounted on an interior surface, such as an interior wall, of the body 220. As depicted in FIG. 1B, the hook component 120 may be shaped substantially in an L-shape that may engage with the mount component 110 and the swivel component 130 when the lid 210 is closed. In an embodiment, the hook component 120 may be mounted on an interior surface of the body 220 that is opposite to the swivel joint 230 of the container 200. In an embodiment, the hook component 120 may be mounted onto the interior surface of the body 220 by means of a plurality of (e.g., two) bolts and nuts 122. Alternatively, the hook component 120 may be riveted or screwed on the interior surface of the body 220. In other embodiments the hook component 120 may be glued onto the interior surface of the body 220.

In an embodiment, the swivel component 130 may be rotatably mounted onto the mount component 110 by means of a pin 132. The pin 132 may be a double-sided rivet, a snap rivet, or the like. Alternatively, the pin 132 may be a combination of a bolt and a nut. Generally, the shape and weighting of the swivel component 130 may be such that 1) when the container 200 is an upright position, the downward force of gravity causes the swivel component 130 to engage with the hook component 120 to lock the locking mechanism 100; and 2) when the container 200 is an upside down position, the downward force of gravity causes the swivel component 130 to disengage from the hook component 120 to unlock the locking mechanism 100. In one illustrative embodiment, as shown in FIGS. 1A and 1B, the swivel component 130 may be made to have a latching portion 134, a handle portion 136, and/or a weighted portion 138. In an embodiment, the latching portion 134, the handle portion 136, and/or the weighted portion 138 are made as a unified single member. In other embodiments, the latching portion 134, the handle portion 136, and/or the weighted portion 138 may be separate pieces that are combined (e.g., by welding, bolting, gluing, etc.) to form the swivel component 130. In an embodiment, when the locking mechanism 100 is in a locked position, the latching portion 134 of the swivel component 130 may latch onto the hook component 120, as illustrated in FIGS. 1A and 1B.

Generally, the locking mechanism 100, such as the mount component 110 and/or the swivel component 130, may be mounted onto the container 200, such as the lid 210, such that the swivel component may be disengaged from the hook component 120 by a user of the container 200 from the outside of the container 200, thereby unlocking the locking mechanism 100. For example, in an embodiment, the locking mechanism 100 may be mounted onto the container 200 such that the handle portion 136 may be accessible by a user of the container 200 from the outside of the container 200. For example, the handle portion 136 may be passed through an opening 212 in the lid 210 of the container 200. The user of the container 200 may pull or exert an upward force on the handle portion 136 to swivel the swivel component 130—clockwise about the pin 132 in FIG. 1A—to unlatch the latching portion 134 from the hook component 120, thereby unlocking the locking mechanism 100 and allowing the user to open the lid 210 of the container 200. On the other hand, when no upward force is being exerted on the handle portion 136 (e.g., the user lets go of the handle portion 136), the container 200 is an upright position, and the lid 220 is closed onto container 200, the weighted portion 138 exerts a downward force onto the swivel component 130, causing the swivel component 130 to swivel—counterclockwise about the pin 132 in FIG. 1A—and latch onto the hook component 120, thereby locking the locking mechanism 100.

Figure 2:
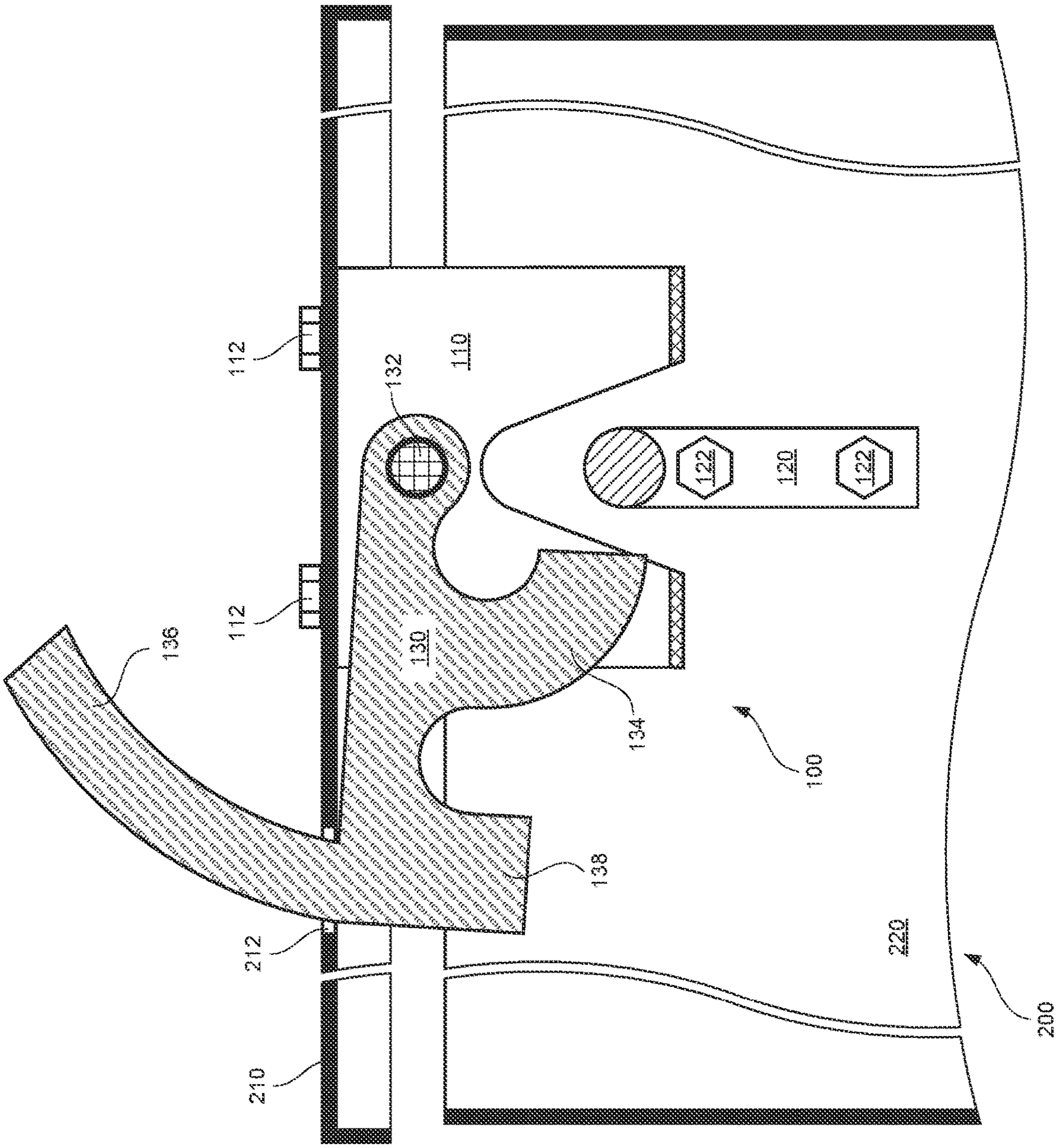
FIG. 2 illustrates a configuration of the locking mechanism, in accordance with an embodiment of the present disclosure.

FIG. 2 illustrates a configuration to unlock the locking mechanism 100 when the container 200 is an upright position, in accordance with an embodiment of the present disclosure. In FIG. 2, the swivel component 130 is shown to have been swiveled upward (and clockwise above the pin 132), for example, by a user pulling or exerting an upward force on the handle portion 136. Accordingly, the latching portion 134 and the mounting component 110 may be disengaged from the hook component 120, allowing the lid 210 of the container 200 to be opened.

Figure 3:
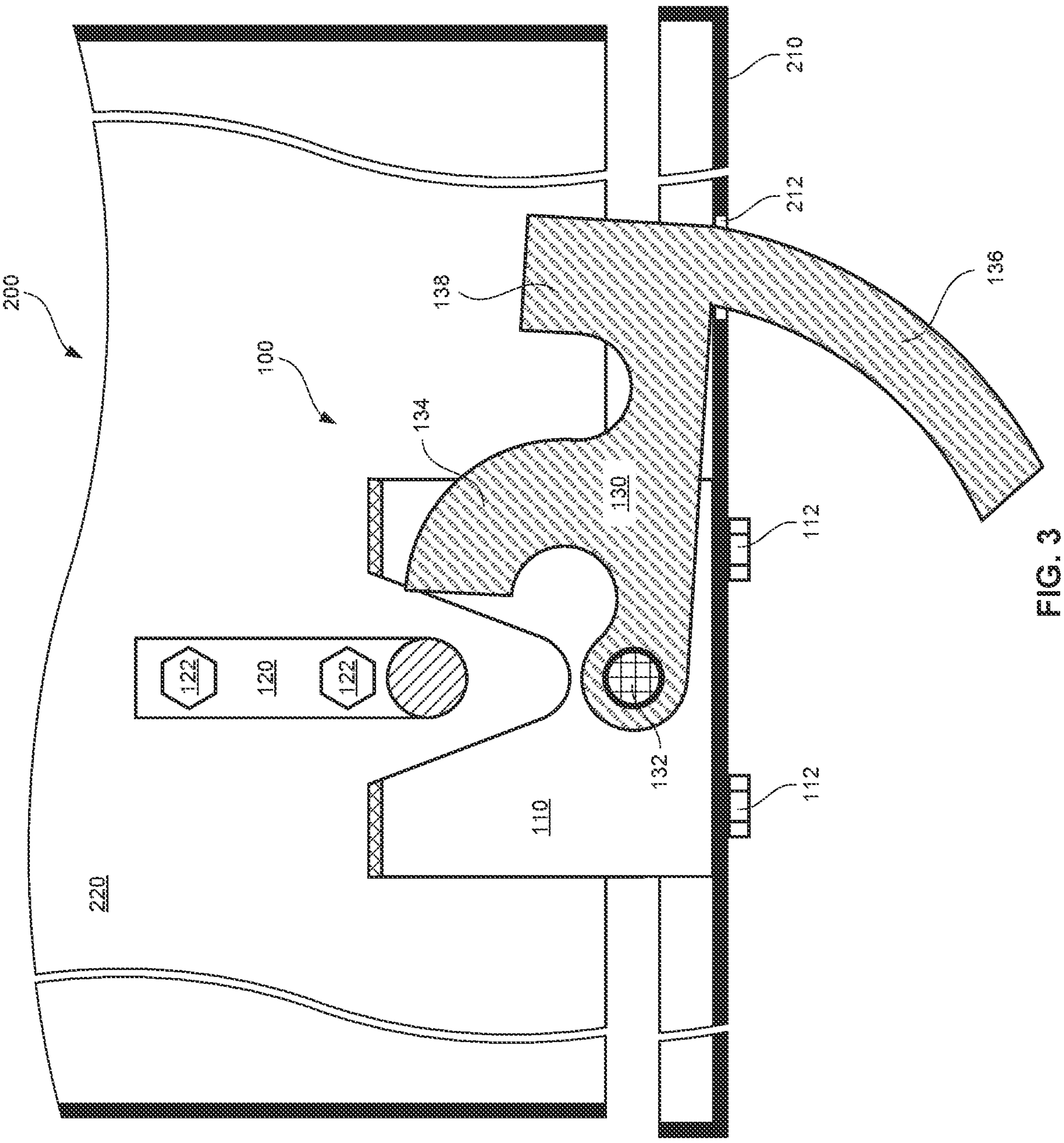
FIG. 3 illustrates another configuration of the locking mechanism, in accordance with an embodiment of the present disclosure.

FIG. 3 illustrates a configuration of the locking mechanism 100 when the container 200 is an upside down position, in accordance with an embodiment of the present disclosure. In this configuration, the weighted portion 138 may exert a downward force onto the swivel component 130, causing the swivel component 130 to swivel—clockwise about the pin 132 in FIG. 3—and unlatch the latching portion 134 from the hook component 120. Accordingly, the locking mechanism 100 may be automatically unlocked and the lid 210 of the container 200 may automatically swivel open about the swivel joint 230 of the container 200. As such, the locking mechanism 100 may allow the container 200 to be emptied by simply turning the container 200 upside down, without a user having to manually exert any force on the handle potion 136.

Those of ordinary skill in the art would appreciate that, in FIGS. 1-3, the shapes, sizes, and placement of the locking mechanism 100 relative to the container 200 are for merely for illustrative purposes. In some embodiments, the locking mechanism 100 may be much smaller relative to the container 200. In other embodiments, the locking mechanism 100 may be on a similar scale as the container 200. In some embodiments, the locking mechanism 100 may be disposed on an exterior of the container 200 rather than or in addition to on the interior of the container 200. Those of ordinary skill in the art would also appreciate the different components of the locking mechanism 100 (i.e., the mount component 110, the hook component 120, the swivel component 130, the bolts, the nuts, etc.) may be made of materials such as metals, plastics, composites (e.g., fiberglass), or the likes. The choice of material may depend on the container and its use, the environment in which the container is expected to be used, etc. The container 200 may be any type of waste receptacle for holding garbage, recyclables, or other types of waste, or may generally be any receptacle that may benefit from having an easily manipulable locking mechanism, such as for child-proofing or other purposes.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A locking mechanism comprising:

an L-shaped hook component comprising a first portion and a second portion and configured to be mounted directly onto an innermost surface of a cavity of a body of a container, wherein the first portion abuts the innermost surface of the cavity and the second portion extends perpendicularly from the innermost surface of the cavity;

a swivel component configured to engage with the hook component when the locking mechanism is locked; and a mount component to which the swivel component is rotatably mounted, wherein the entirety of the mount component is configured to be mounted directly onto an innermost surface of a lid of the container such that the mount component abuts the innermost surface of the lid, wherein when the container is in an upright position, the locking mechanism is unlocked by applying an upward force onto the swivel component, and when the container is an upside down position, the locking mechanism unlocks automatically.

2. The locking mechanism of claim 1, wherein the mount component is configured to be mounted onto the innermost surface of the lid of the container using a plurality of bolts, rivets, or screws.

3. The locking mechanism of claim 1, wherein the hook component is configured to be mounted onto the innermost surface of the cavity of the body of the container using a plurality of bolts, rivets, or screws.

4. The locking mechanism of claim 1, wherein the swivel component is rotatably mounted onto the mount component using a pin, a rivet, or a bolt.

5. The locking mechanism of claim 1, wherein the mount component includes a groove that engages with the hook component when the locking mechanism is in a locked position.

6. The locking mechanism of claim 1, wherein the swivel component comprises:

a latching portion;

a handle portion; and a weighted portion.

7. The locking mechanism of claim 6, wherein the latching portion, the handle portion, and the weighted portion constitute a monolithic member.

8. The locking mechanism of claim 6, wherein the handle portion is substantially in the shape of an arc.

9. The locking mechanism of claim 6, wherein, when the locking mechanism is in a locked position, the handle portion is substantially below the innermost surface of the lid.

10. The locking mechanism of claim 6, wherein, when the locking mechanism is in an unlocked position, the handle portion is substantially above an exterior surface of the lid.

11. The locking mechanism of claim 1, wherein the swivel component comprises a latching portion that latches onto the hook component when the locking mechanism is in a locked position.

12. The locking mechanism of claim 1, wherein the swivel component comprises a handle portion that is accessible from an exterior surface of the lid of the container.

13. The locking mechanism of claim 12, wherein the handle portion passes through an opening in the lid of the container.

14. The locking mechanism of claim 12, wherein, when the container is in the upright position, the upward force is applied to the handle portion to unlatch the latching portion from the hook component.

15. The locking mechanism of claim 1, wherein the swivel component comprises a weighted portion, and when the container is in the upright position, the weighted portion applies a downward force onto the swivel component to keep the latching portion latched onto the hook component.

16. The locking mechanism of claim 1, wherein the swivel component comprises a weighted portion, and when the container is in the upside down position, the weighted portion applies a downward force onto the swivel component to unlatch the latching portion from the hook component.

17. The locking mechanism of claim 1, wherein the mount component is made of a metal, a plastic, or a composite.

18. The locking mechanism of claim 1, wherein the hook component is made of a metal, a plastic, or a composite.

19. The locking mechanism of claim 1, wherein the swivel component is made of a metal, a plastic, or a composite.

20. The locking mechanism of claim 1, wherein the container is a waste receptacle.

* * * * *